United States Patent
Aoyanagi

(10) Patent No.: US 7,226,173 B2
(45) Date of Patent: Jun. 5, 2007

(54) PROJECTOR WITH A PLURALITY OF CAMERAS

(75) Inventor: Hisakazu Aoyanagi, Minato-ku (JP)

(73) Assignee: NEC Viewtechnology, Ltd., Tokyo (JP)

( * ) Notice: Subject to any disclaimer, the term of this patent is extended or adjusted under 35 U.S.C. 154(b) by 206 days.

(21) Appl. No.: 11/054,317

(22) Filed: Feb. 10, 2005

(65) Prior Publication Data

US 2005/0179875 A1 Aug. 18, 2005

(30) Foreign Application Priority Data

Feb. 13, 2004 (JP) ............................. 2004-037054

(51) Int. Cl.
*G03B 3/00* (2006.01)

(52) U.S. Cl. .......................................... 353/101; 353/7

(58) Field of Classification Search ............ 353/7, 353/94, 97, 101, 69, 70; 348/42, 47–51, 348/744, 745

See application file for complete search history.

(56) References Cited

U.S. PATENT DOCUMENTS

| | | | | |
|---|---|---|---|---|
| RE37,610 E | * | 3/2002 | Tsuchiya et al. | ............ 340/435 |
| 7,004,590 B2 | * | 2/2006 | Kitabayashi | ............ 353/121 |

FOREIGN PATENT DOCUMENTS

| | | |
|---|---|---|
| JP | H04-355740 A | 12/1992 |
| JP | H07-159159 A | 6/1995 |
| JP | H09-281597 A | 10/1997 |
| JP | 2000-122617 A | 4/2000 |
| JP | 2000-241874 A | 9/2000 |
| JP | 2001-61121 A | 3/2001 |
| JP | 2001-320652 A | 11/2001 |
| JP | 2002-62842 A | 2/2002 |
| JP | 2003-042733 A | 2/2003 |
| JP | 2003-307466 A | 10/2003 |
| JP | 2003-348498 A | 12/2003 |
| WO | WO 2002/067050 A1 | 8/2002 |

* cited by examiner

*Primary Examiner*—Christopher Mahoney
*Assistant Examiner*—Robert C. Do
(74) *Attorney, Agent, or Firm*—Sughrue Mion, PLLC

(57) ABSTRACT

A projector having a plurality of cameras for adjusting the focus of projected images, correcting projected images that are distorted and correcting projected images to match the outer profile of a screen if the screen is used as a projection object. The projector having a projection device, a projection lens, a focus adjuster, a zoom adjuster, an imager having the plurality of cameras for capturing respective images of a projection object a projection area calculator for calculating a projection area of an image depending on the distance from the projection lens based on the zoomed position from the zoom adjuster, a three-dimensional position detector for detecting the three-dimensional position of a predetermined object point corresponding to identical object points in the respective images captured by the cameras, and a distance detector for detecting the distance up to the object point from the three-dimensional position of the predetermined object point.

8 Claims, 15 Drawing Sheets

PROJECTOR WITH A PLURALITY OF CAMERAS

BACKGROUND OF THE INVENTION

1. Field of the Invention

The present invention relates to a projector, and more particularly to a projector having a plurality of cameras for capturing an image projected onto a screen.

2. Description of the Related Art

In recent years, projectors have been improved to the point where they can be used in a variety of applications. In view of the wide range of applications, it is desirable for the operator to be able to install the projector simply under optimum conditions. To meet such a demand, it is necessary to adjust the focus of projected images to make the projected images sharp and also to correct projected images out of distortion when images are projected from projectors which swings from side to side and tilts or when images are projected onto shaped surfaces of projection objects.

One known rangefinder for use in focus adjustments is an optical shape sensor disclosed in Japanese laid-open patent publication No. 2003-42733. The disclosed optical shape sensor has light-emitting elements for applying a plurality of variable-amount light beams modulated with a certain frequency to a surface to be measured, and detecting elements for detecting reflected light beams only in a certain direction. The optical shape sensor acquires distance information from phase information that is obtained from the detected light beams.

Japanese laid-open patent publication No. H9-281597 discloses a liquid crystal projector which performs a process of correcting a projected image out of distortion. The liquid crystal projector has an angle detecting means for detecting an angle at which the projector is installed, and a distance detecting means for detecting the distance between the projector and an object onto which an image is projected from the projector. The angle of a liquid crystal display unit of the projector is adjusted to an angle which is calculated based on the angled detected by the angle detecting means and the distance detected by the distance detecting means.

Japanese laid-open patent publication No. 2000-122617 reveals a trapezoidal distortion correcting apparatus having a plurality of distance sensors mounted at different positions on the front face of a liquid crystal projector housing. The trapezoidal distortion correcting apparatus also has a control microcomputer which calculates an angle of tilt of the liquid crystal projector housing with respect to the screen based on distances detected by the distance sensors, and decimates pixel data of scanning lines to produce a trapezoidal distortion which is a reversal of the trapezoidal distortion that is actually present in a projected image, based on the calculated angle of tilt.

Conventional processes for adjusting the focus of projected images to make the projected images sharp and also to correct projected images out of distortion when images are projected from projectors which swings from side to side and tilts or when images are projected onto shaped surfaces of projection objects are problematic in that the processes are tedious and time-consuming.

The optical shape sensor disclosed in Japanese laid-open patent publication No. 2003-42733 allows focus adjustments to be made automatically, but needs to be combined with other means for making other adjustments.

Though the processes disclosed in Japanese laid-open patent publication No. H9-281597 and Japanese laid-open patent publication No. 2000-122617 can automatically correct projected images out of distortion, they need to make other adjustments in combination with other means.

When a projector is used to make a presentation, if images projected by the projector are large, then the presenter occasionally needs to stand in front of a projection object, i.e., an object to project images onto, such as a screen, to explain. One problem that occurs when the presenter stands in front of the screen is that the presenter is annoyed by the glare of strong light emitted by the projector which enters the eyes of the presenter.

While making a presentation using a projector, the presenter often needs to change projected images and/or write onto the projected images as the presentation progresses. Heretofore, since the presenter uses a remote controller or a mouse to control the projector, it is not easy to change projected images and/or write onto the projected images while standing in front of the screen.

The conventional practice has been to use a camera in combination with a projector for correcting the projected position of a projected image or for correcting a projected image out of distortion. The conventional correcting process that uses a camera is based on the assumption that the projection object is a flat surface. If the projection object is a screen, then the camera can only detect the outer frame of the screen. Therefore, if the projection object is a curved surface, but not a flat surface, then projected images that are distorted cannot be properly corrected. In this application, "a curved surface" means all kinds of surface that is not flat. Because the camera detects only the outer frame of the screen, but not the distance to the screen, other means need to be employed to adjust the focus of projected images, to detect a person in front of the projection object, and to detect when the surface of the projection object is touched.

SUMMARY OF THE INVENTION

It is an object of the present invention to provide a projector having a plurality of cameras for adjusting the focus of projected images, correcting projected images that are distorted when images are projected from the projector which swings from side to side and tilts or when images are projected onto a shaped surface of a projection object, and correcting projected images to match the outer profile of the screen if the screen is used as a projection object.

It is another object of the present invention to provide a projector for masking light applied to a person in order to prevent the person from being 10 annoyed by the glare of the light, detecting the coordinates of a point on the surface of a projection object which is touched by a finger or a pointing rod and for projecting an icon onto the projected image based on the detected coordinates, operating the projector based on the icon, or projecting an image along the coordinates of the icon when the icon is pointed to by the finger or by the pointing rod.

According to the present invention, there is provided a projector comprising a projection device having a projection lens, a focus adjuster for adjusting the focus of the projection lens, a zoom adjuster for adjusting the zooming of the projection lens, an imager having a plurality of cameras for capturing respective images of a projection object, a projection area calculator for calculating a projection area of an image depending on the distance from the projection lens based on a zoomed position from the zoom adjuster, a three-dimensional position detector for detecting the three-dimensional position of a predetermined object point corresponding to identical object points in the respective images captured by each of the cameras and the projection area of the image calculated by the projection area calculator, and a distance detector for detecting the distance up to the object point from the three-dimensional position of the predetermined object point.

The object point may comprise a predetermined pattern projected from the projection device onto the projection object near a central area thereof, and the focus of the projection lens may be adjusted by the focus adjuster based on the distance up to the object point which is detected by the distance detector.

The projector may further include a projection surface detector for detecting distances up to the object points from the three-dimensional positions of a plurality of predetermined object points which are detected by the three-dimensional position detector and arranging the detected distances two-dimensionally, wherein the object points may comprise a plurality of patterns projected in a plane onto the projection object by the projection device, the distance detector may calculate an average distance based on the distances up to the object points which are detected by the projection surface detector, and the focus adjuster may adjust the focus of the projection lens based on the calculated average distance.

The projector may further include an image controller for controlling a projected image, and a distortion correction calculator for calculating a corrective value for correcting a projected image that is distored, wherein the distortion correction calculator may calculate a distortion correction coefficient for correcting a distortion of the projected image based on the difference between the distances that is based on the distances up to the object points which are detected by the projection surface detector, and the image controller may correct the projected image that is inputted to the projection device based on the distortion correction coefficient.

The projector may further include an image controller for controlling a projected image, a projection surface detector for detecting distances up to the object points from the three-dimensional positions of a plurality of the predetermined object points which are detected by the three-dimensional position detector and arranging the detected distances two-dimensionally, and a distortion correction calculator for calculating a corrective value for correcting a projected image that is distored, wherein the projection object may comprise a screen, the object points may comprise a boundary line between the screen and a background scene and an outer profile of the projected image which is projected onto the screen by the projection device, the distortion correction calculator may calculate a distortion correction coefficient for the projected image input to the projection device so that the outer profile of the projected image is aligned with the boundary line between the screen and the background scene, based on the projection surface detected by the projection surface detector, and the image controller may correct the projected image based on the distortion correction coefficient.

The projector may further include an image controller for controlling a projected image, a projection surface detector for detecting distances up to the object points from the three-dimensional positions of a plurality of the predetermined object points which are detected by the three-dimensional position detector and arranging the detected distances two-dimensionally, and a person detector/mask position calculator for detecting an obstacle including a person interposed between the projected image which is projected onto the projection object and the projection device, and generating information to mask a projected image which is projected onto the obstacle, wherein the object points may be two-dimensionally indicated on the projected image which is projected onto the projection object, the person detector/mask position calculator may compare distances up to the object points with the projection surface detector, extract a group of a plurality of the object points which are disposed at shorter distances and arranged two-dimensionally, define the extracted group as the obstacle including a person, and acquire two-dimensional positions of the group, and the image controller may convert an image of a portion of the projected image, which corresponds to the two-dimensional positions of the group, into a predetermined color, and project the image in the predetermined color from the projection device.

The projector may further include an image controller for controlling a projected image, an image information generator for generating image information, a projection surface detector for detecting distances up to the object points from the three-dimensional positions of a plurality of the predetermined object points which are detected by the three-dimensional position detector and arranging the detected distances two-dimensionally, and a pointed position detector for detecting an obstacle having a predetermined shape which is interposed between a predetermined area of the projected image which is projected onto the projection object, as a pointing command, wherein the object points may be two-dimensionally indicated on the projected image which is projected onto the projection object, the pointed position detector may compare distances up to the object points with the projection surface detector, extract a group of a plurality of the object points which are disposed on a surface of the projection object and disposed in a predetermined shape at shorter distances, define the extracted group as the pointing command, acquire two-dimensional positions of the group, and output the acquired two-dimensional positions of the group to the image information generator, and the image information generator may read contents of the pointing command from the two-dimensional positions of the group input thereto, perform a process corresponding to the pointing command, add corresponding information to the image information, and output the image information with the added information to the image controller.

The plural cameras allow the three-dimensional position of an imaging object to be detected, and the three-dimensional position detector can detect the position and surface shape of the projection object, the outer frame of a screen, if the screen is used as the projection object, a person in front of the projection object, and the position of an obstacle having a predetermined shape which has touched the surface of the projection object.

According to the present invention, since the three-dimensional position of the imaging object can be detected when it is imaged by the cameras, the distance up to the projection object can be detected for focus adjustment, the position and surface shape of the projection object and the outer frame of a screen if the screen is used as the projection object can be detected, the projected distorted image can be corrected when the image is projected onto the projection object by the projector with swings and tilts or projected onto a shaped surface of the projection object, and the projected image can be brought so that to match the outer profile of the screen if the screen is used as the projection object.

The means for detecting identical object points from the images captured by the cameras refers to the projection area of the projector and determines ranges of positions and ranges of sizes, in the respective images captured by the cameras, of a predetermined pattern projected onto the projection object for thereby preventing a malfunction in detecting the identical object points.

The above and other objects, features, and advantages of the present invention will become apparent from the following description with reference to the accompanying drawings which illustrate examples of the present invention.

DETAILED DESCRIPTION OF THE PREFERRED EMBODIMENTS

A projector with a plurality of cameras according to the present invention has a plurality of cameras disposed to face the projecting direction of the projector for capturing an image projected by the projector, and a means for detecting a three-dimensional position of an imaged object according to triangulation of images captured by the cameras.

Based on the three-dimensional position of the imaged object, the distance between a projection object onto which the image is projected and the projector is acquired in order to adjust the focus of the image. The position and surface shape of the projection object can also be detected, and if the projection object is a screen, then the outer frame of the screen can be detected.

The projector also has a means for correcting image distortion when the image is projected onto the projection object from the projector which swings from side to side and tilts or when the image is projected onto a shaped surface of the projection object, and for correcting the image so that to match the outer profile of the screen if the screen is used as the projection object.

The projector also has a stereoscopic matching circuit for detecting identical object points from the images captured by the cameras. The stereoscopic matching circuit has a means for referring to a projection area of the projector and detecting identical object points from ranges of positions and ranges of sizes, in the respective images captured by the cameras, of a predetermined pattern projected onto the projection object for thereby preventing a malfunction of the projector.

The projector also has a means for initially adjusting the projected image to focus in a central area thereof, detecting the position of the projection object, the surface shape of the projection object, or the outer frame of a screen if the screen is used as the projection object, and thereafter adjusting the projected image so that it is focused on the average distance up to the projection object.

Furthermore, when a person stands in front of the projection object, only a portion of the projected image that is projected onto the person is masked while the person is in motion, thus preventing the person from being annoyed by the glare of light emitted by the projector. The coordinates of a point on the surface of the projection object which is touched by a finger or by a pointing rod are detected, and an icon is projected onto the projected image based on the detected coordinates. Then, when the icon is pointed to by the finger or by the pointing rod, the operation of the projector is controlled by the icon or the image that is projected along the coordinates of the icon.

A projector with a plurality of cameras according to a first embodiment of the present invention will be described below with reference to FIGS. 1 and 2.

Figure 1:
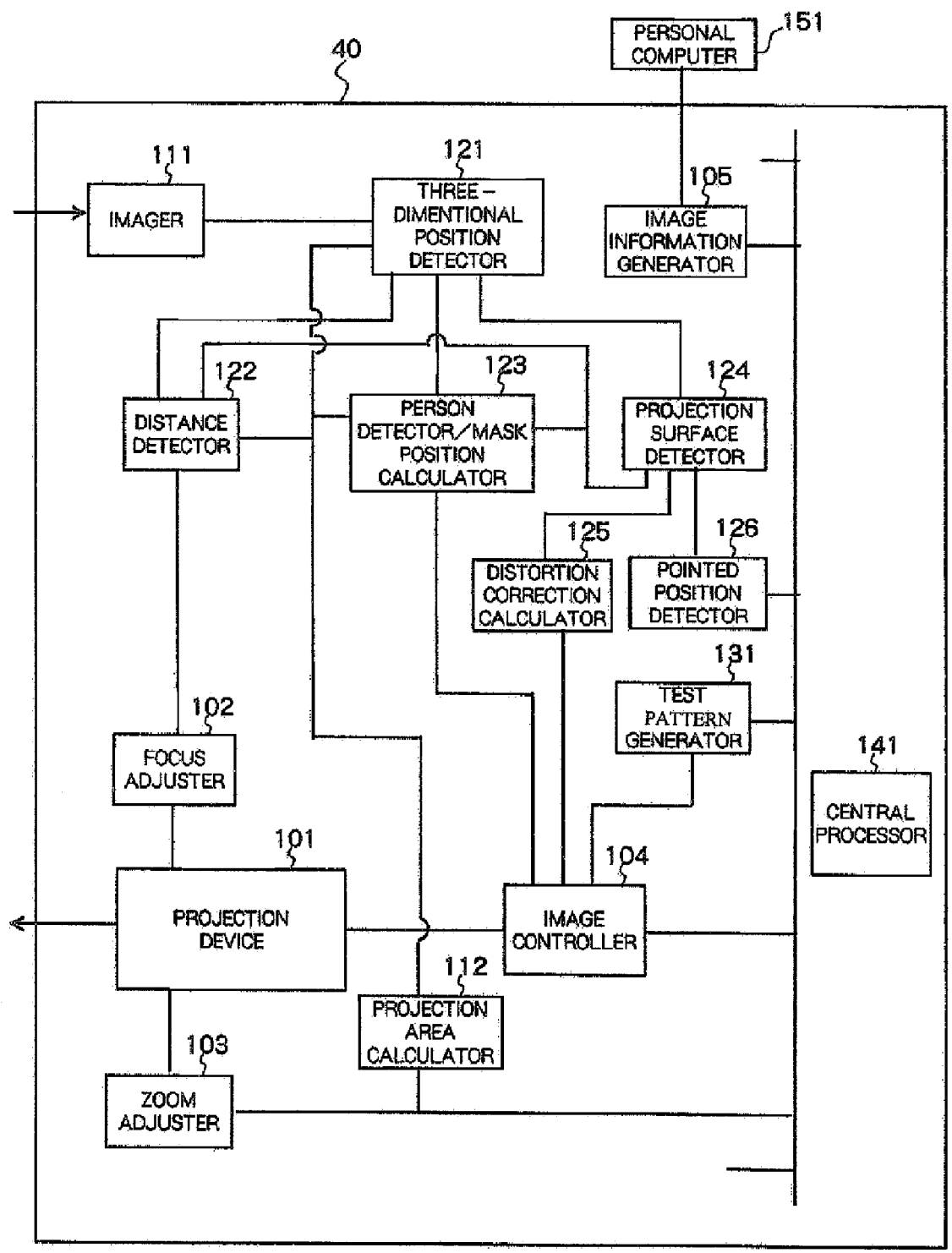
FIG. 1 is a block diagram of a projector according to the present invention.

As shown in FIG. 1, projector 40 has projection device 101 having a projection lens and a display unit, focus adjuster 102 for adjusting the focus of the projection lens, zoom adjuster 103 for adjusting the zooming of the projection lens, image controller 104 for controlling a projected image, image information generator 105 connected to external personal computer 151 for generating an image, imager 111 having a plurality of cameras, projection area calculator 112 for calculating a projection area from a zoomed position, three-dimensional position detector 121 for detecting the three-dimensional position of a predetermined object point from images captured by the cameras and the projection area, distance detector 122 for detecting the distance up to the object point, person detector/mask position calculator 123 for detecting a person in an image plane and calculating a position to be masked in the image, projection surface detector 124 for detecting the three-dimensional shape of a projection surface, distortion correction calculator 125 for calculating a corrective value for correcting a projected image distortion based on the detected shape of the projection surface, pointed position detector 126 for detecting a pointed position in the image plane for instructing image information generator 105 to perform a predetermined operation, test pattern generator 131 for generating a predetermined test pattern to be projected onto the projection surface, and central processor 141 for controlling operation of the components of projector 40.

A detailed circuit of projector 40 will be described below with reference to FIG. 2. Projection device 101 has projection lens 1, including a focus lens unit and a zoom lens unit, of projector 40, and projection circuit 34 of the display unit.

Focus adjuster 102 has focus lens actuating motor 2 for actuating a focus lens unit of projection lens 1, focus lens position sensor 3 for detecting the angular position of the focus lens unit of projection lens 1, focus lens position detecting circuit 6 for detecting the position of the focus lens unit from a detected signal from focus lens position sensor 3, and focus lens actuating circuit 7 for energizing focus lens actuating motor 2. Focus adjuster 102 also has focus lens control circuit 27 for controlling the focus lens unit to focus on an average distance detected by average distance detecting circuit 25 of distance detector 122 or a central distance detected by central distance detecting circuit 26 of distance detector 122. Focus lens actuating circuit 7 is supplied with focus lens actuating signal 10 for actuating the focus lens unit.

Zoom adjuster 103 has zoom lens actuating motor 4 for actuating the zoom lens unit of projection lens 1, zoom lens position sensor 5 for detecting the angular position of the zoom lens unit of projection lens 1, zoom lens position detecting circuit 8 for detecting the position of the zoom lens unit from a detected signal from zoom lens position sensor 5, and zoom lens actuating circuit 9 for energizing zoom lens actuating motor 4. Zoom lens actuating circuit 9 is supplied with zoom lens actuating signal 11 for actuating the zoom lens unit.

Image controller 104 has image distortion correcting circuit 24 for correcting an image distortion produced when an image represented by projected image input signal 23 is projected onto a projection object, based on a calculated result from distortion correction coefficient calculating circuit 22, image masking circuit 30 for masking an area projected onto a person in front of the projected image, whose area is outputed from image distortion correcting circuit 24, based on a calculated result from person masking position calculating circuit 29, and switching circuit 32 for selecting, one at a time, output signals from image masking circuit 30 and an output signal from display pattern generating circuit 31 of the test pattern generator 131. Switching circuit 32 is controlled by projected image switching signal 33.

Imager 111 has two cameras 13, 14 incorporated in projector 40, optical distortion correcting circuit 15 for correcting an optical distortion of camera 13, and optical distortion correcting circuit 16 for correcting an optical distortion of camera 14.

Projection area calculator 112 has projection area calculating circuit 12 for calculating a projection area from the zoom lens unit position detected by zoom lens position detecting circuit 8, i.e., a projected range of an image depending on the distance from projector 40.

Three-dimensional position detector 121 has stereoscopic matching circuit 17 for detecting identical object points in images captured by two cameras 13, 14 by referring to the projection area calculated by projection area calculating circuit 12, three-dimensional position detecting circuit 18 for detecting the three-dimensional position of the object point according to triangulation from the physical positions, on sensor element surfaces of the cameras, of the object point in the images captured by two cameras 13, 14, the interval between the lenses of the cameras on the sensor element surfaces, and the positions and directions of two cameras 13, 14, and three-dimensional position memory 19 for storing the three-dimensional position detected by three-dimensional position detecting circuit 18.

Distance detector 122 has central distance detecting circuit 26 for detecting the distance of the center of the three-dimensional position detected by three-dimensional position detecting circuit 18 by referring to the projection area calculated by projection area calculating circuit 12, and average distance detecting circuit 25 for detecting the average distance of a portion of the projection object where the projected image is displayed from a detected projection surface stored in detected projection surface register 21 and the projection area calculated by projection area calculating circuit 12.

Person detector/mask position calculator 123 has person detecting circuit 28 for detecting a person standing in front of the projection object from the detected three-dimensional position by three-dimensional position detecting circuit 18, the three-dimensional position stored in three-dimensional position memory 19, and the detected projection surface stored in detected projection surface register 21, and person mask position calculating circuit 29 for calculating an area of the projected image which is to be projected onto the person, whose area is outputed from image distortion correcting circuit 24 of image controller 104, from the person detected by person detecting circuit 28 and the projection area calculated by projection area calculating circuit 12.

Projection surface detector 124 has projection surface detecting circuit 20 for detecting the position and surface shape of the projection object, and the outer frame of a screen if the screen is used as the projection object, from the detected three-dimensional position by three-dimensional position detecting circuit 18, and detected projection surface register 21 for storing a detected projection surface from projection surface detecting circuit 20.

Distortion correction calculator 125 has distortion correction coefficient calculating circuit 22 for calculating a coefficient for correcting an image distortion produced when an image is projected onto the projection object, from the relative positional relationship between the detected projection surface stored in detected projection surface register 21 and the projection area calculated by projection area calculating circuit 12.

Pointed position detector 126 has pointing detecting circuit 35 for detecting a finger or a pointing rod which has touched the projection object from the detected projection surface stored in detected projection surface register 21 and the projection area calculated by projection area calculating circuit 12. The position in the projected image of a finger or a pointing rod which has touched the projection object, as detected by pointing detecting circuit 35, is outputted as pointing coordinate output signal 36 to image information generator 105, for example, and processed thereby.

Test pattern generator 131 has display pattern generating circuit 31 for generating a predetermined display pattern to be projected in order to detect the three-dimensional position of the projection object. The generated display pattern is supplied via switching circuit 32 of image controller 104 to projection device 101, which projects the display pattern onto the projection object.

Figure 3:
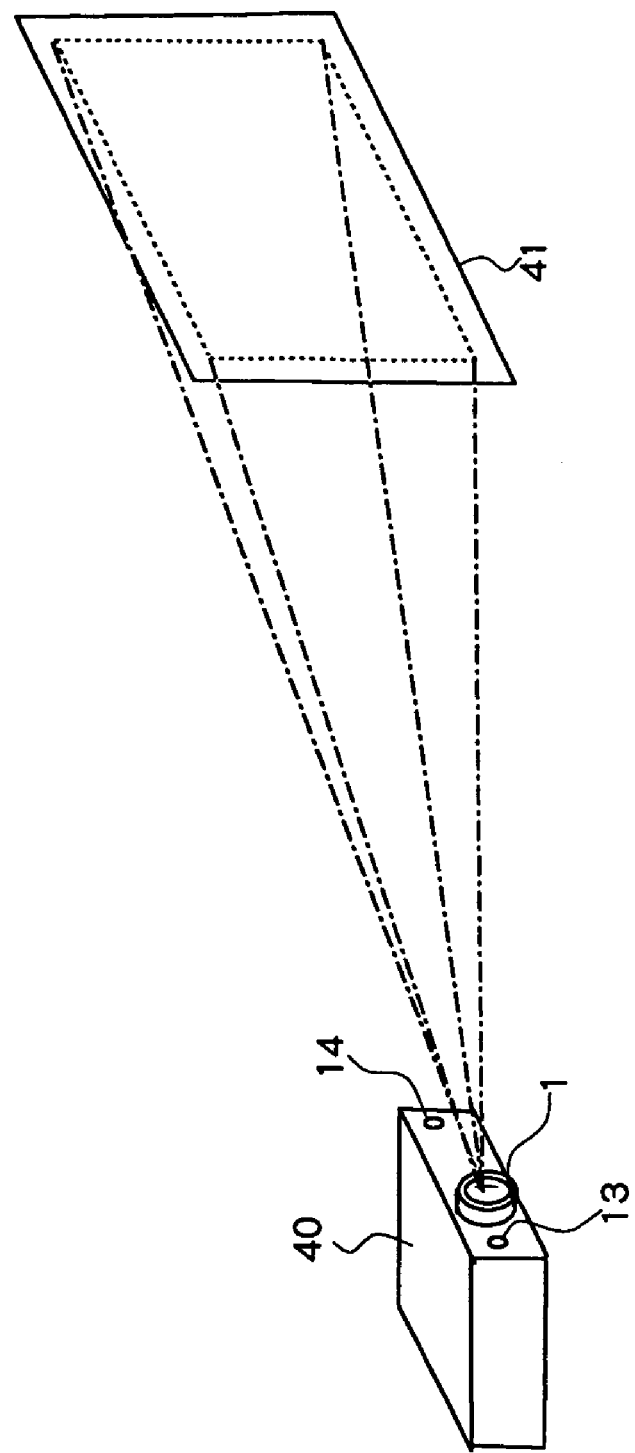
FIG. 3 is a diagram showing the manner in which an image is projected onto a screen from the projector with a plurality of cameras according to the first embodiment.

Operation of the projector with plural cameras according to the first embodiment of the present invention will be described below with reference to FIGS. 3 through 13. As shown in FIG. 3, projector 40 has projection lens 1 and two cameras 13, 14 that are disposed one on each side of projection lens 1. Projection lens 1 projects an image onto screen 41.

Figure 4:
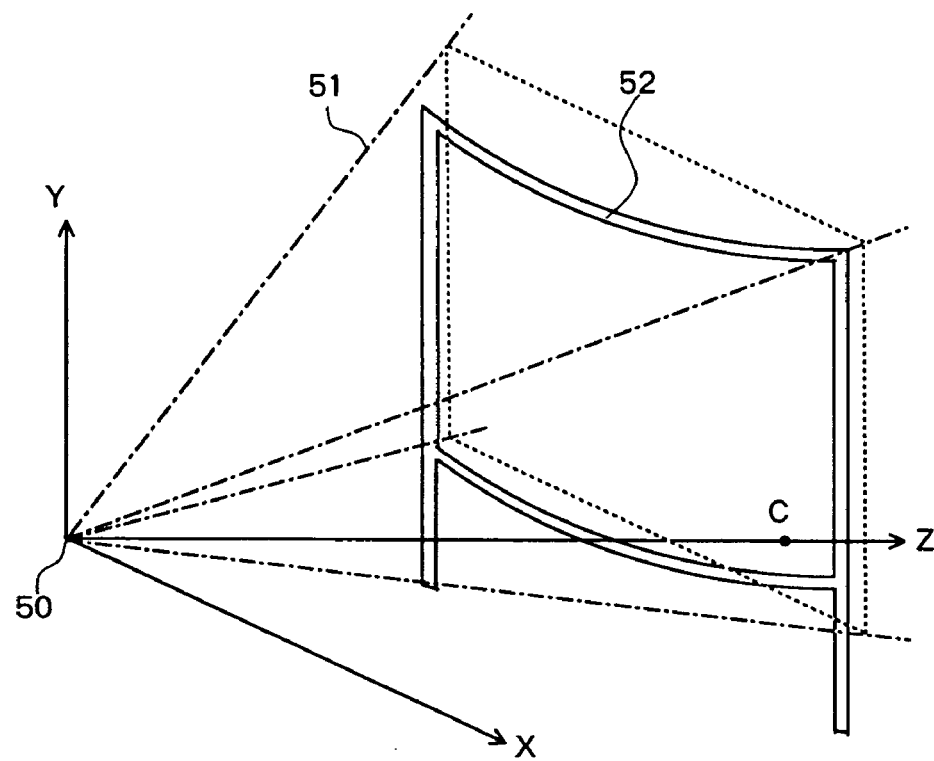
FIG. 4 is a diagram showing a curved screen onto which an image is projected from a central projection point positioned obliquely leftward in front of the screen, which is illustrated in a coordinate system whose origin is aligned with the central projection point.
Figure 5:
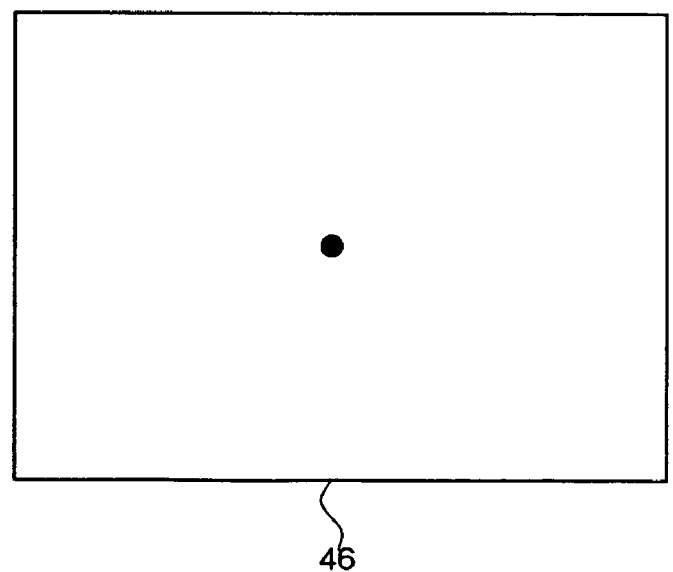
FIG. 5 is a diagram showing a focus adjustment pattern by way of example.
Figure 6:
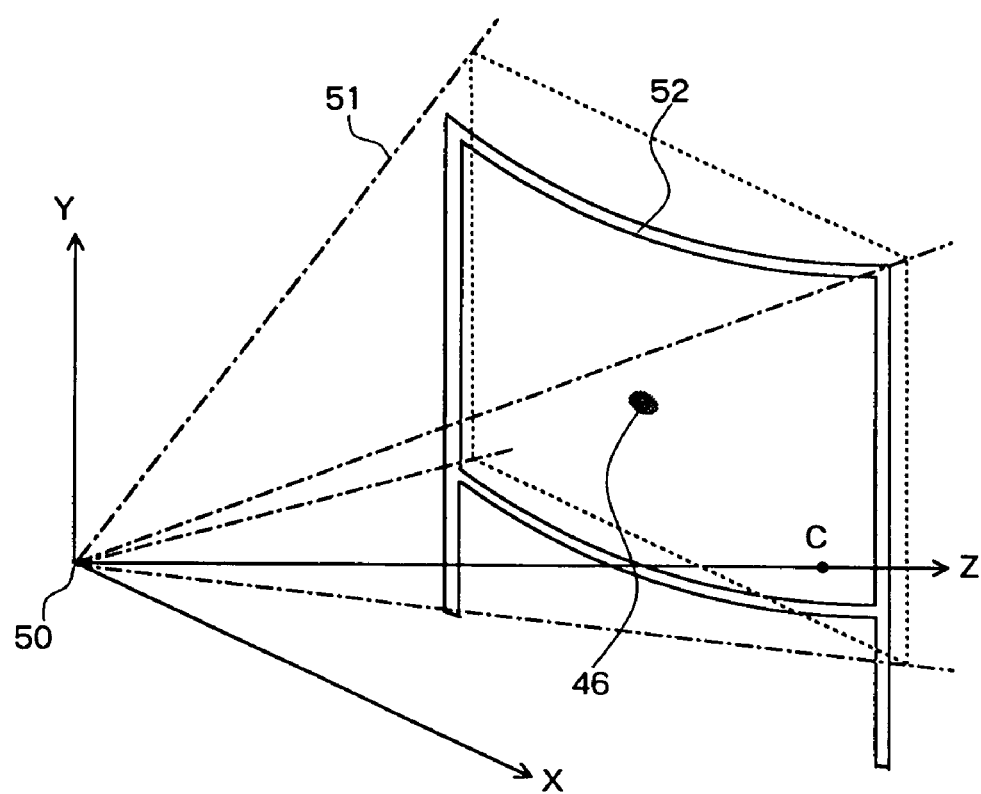
FIG. 6 is a diagram showing the focus adjustment pattern as it is projected onto the curved screen shown in FIG. 4.

A mode of operation of the projector according to the first embodiment for projecting an image onto curved screen 52 shown in FIG. 4 from a point positioned obliquely leftward in front of curved screen 52 will be described below. If curved screen 52 is positioned, as shown in FIG. 4, then the projector is installed such that the entire projected image from the projector covers curved screen 52. When the projector is initially installed, the projected image is out of focus in most cases, and hence needs to be adjusted in focus. For focus adjustment, display pattern generating circuit 31 generates a focus adjustment pattern with a single central dot, such as focus adjustment pattern 46 shown in FIG. 5. Switching circuit 32 is controlled by projected image switching signal 33 to select an output signal from display pattern generating circuit 31, thereby allowing focus adjustment pattern 46 to be projected through projection circuit 34 and projection lens 1. When focus adjustment pattern 46 is projected onto curved screen 52 shown in FIG. 4, focus adjustment pattern 46 is displayed as being blurred because it is out of focus, as shown in FIG. 6. The focus adjustment pattern which can be used is not limited to focus adjustment pattern 46 shown in FIG. 5.

Figure 7:
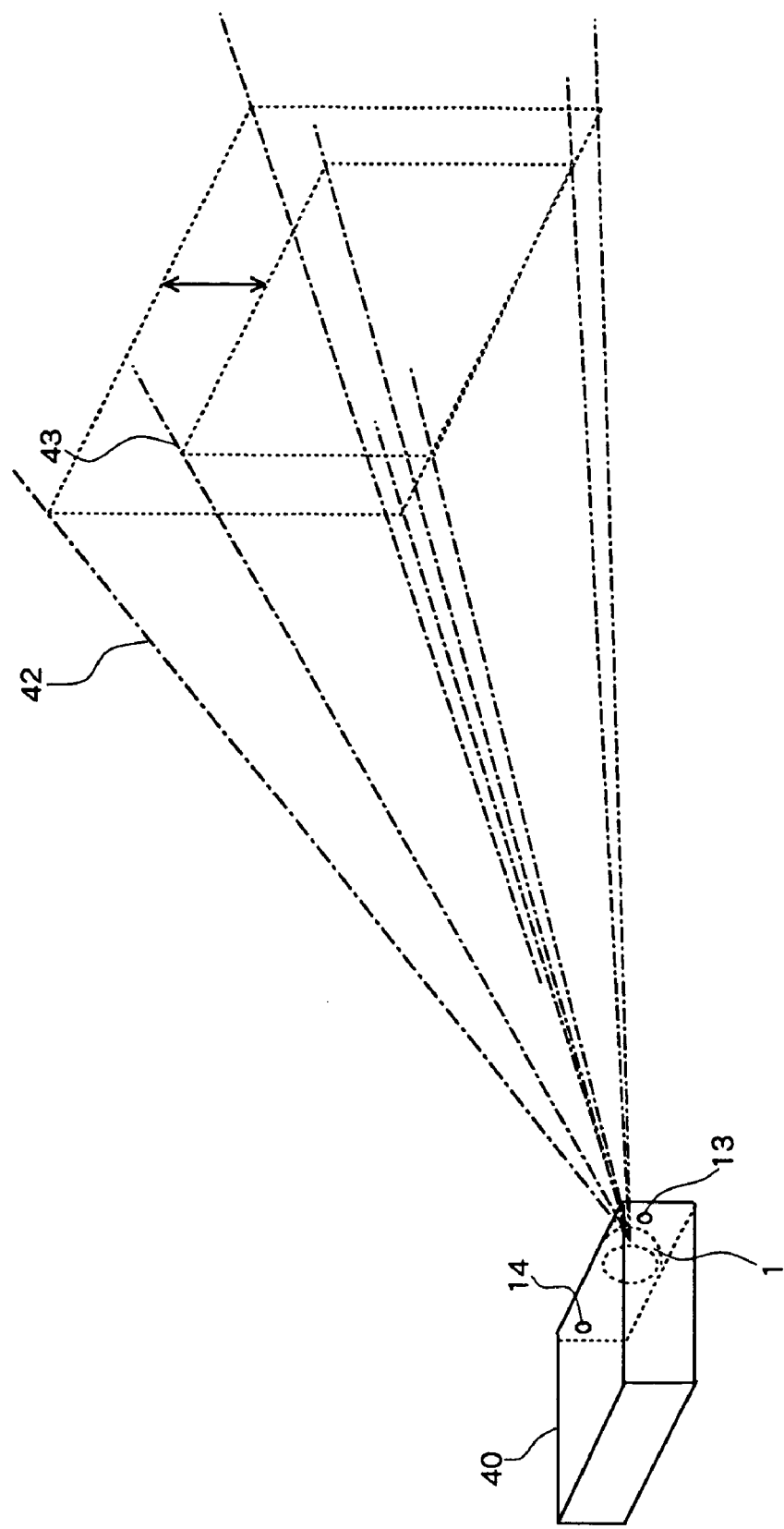
FIG. 7 is a diagram showing projection areas of the projector at maximum and minimum zoom ratios, respectively.

When focus adjustment pattern 46 is projected as shown in FIG. 6, focus adjustment pattern 46 projected onto the projection object is imaged by cameras 13, 14. Optical distortions caused in the respective images captured by cameras 13, 14 are corrected by optical distortion correcting circuit 15 and optical distortion correcting circuit 16. After the optical distortions caused by cameras 13, 14 are corrected, the two captured images are compared with each other by stereoscopic matching circuit 17 to detect identical object points in the captured images. From focus adjustment patterns 46 in the two captured images, identical object points are detected by referring to a zoom ratio and projection area 51 which is an image projection range depending on the distance from the projector. The zoom ratio is determined from the position of the zoom lens unit detected by zoom lens position detecting circuit 8 based on the known relationship between zoom ratios and zoom lens positions. Projection area 51 is calculated by projection area calculating circuit 12. As shown in FIG. 7, depending on the zoom ratio, projection area 51 of the projector changes from projection area 42 at a maximum zoom ratio to projection area 43 at a minimum zoom ratio. Since focus adjustment pattern 46 has known dimensions and positional relationship and cameras 13, 14 also have known positions, directions, and imaging areas, the ranges of positions and the ranges of sizes of focus adjustment patterns 46 in the two captured images can be determined by referring to projection area 51. Therefore, other points in the captured images and the focus adjustment pattern are prevented from being detected erroneously as identical object points.

A focus adjustment pattern with a single central dot, which is generated by display pattern generating circuit 31 and projected by projection circuit 34, the outer frame of a screen if the screen is used as the projection object, or another background scene may be detected as an identical object point.

Figure 8:
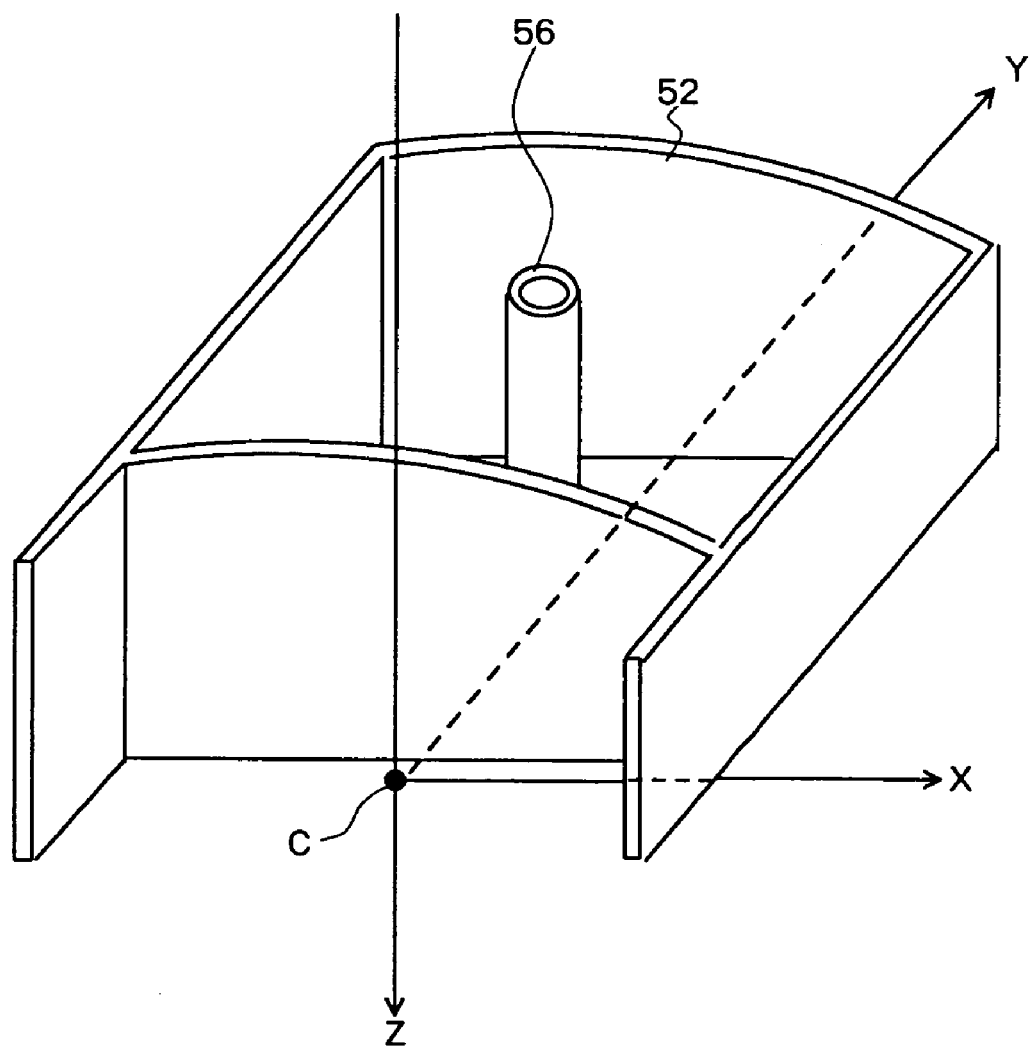
FIG. 8 is a diagram showing the three-dimensional relationship between an X-Y plane passing through a point C on the optical axis which extends as a Z-axis through the central projection point, the curved screen, and the focus adjustment pattern.

Three-dimensional position detecting circuit 18 converts respective object points in the captured images into physical positions on the sensor element surfaces of the cameras, and detects the three-dimensional position of the object point according to triangulation from the distances between the sensor element surfaces and the lenses of the cameras, the positions of the two cameras, and the directions of the cameras. When focus adjustment pattern 46 is displayed on curved screen 52 shown in FIG. 6, the three-dimensional position of the object point that is detected by three-dimensional position detecting circuit 18 is illustrated in FIG. 8 for better visual perception where an X-Y plane passes through a point C in FIG. 6 on a downwardly oriented Z-axis.

Figure 9:
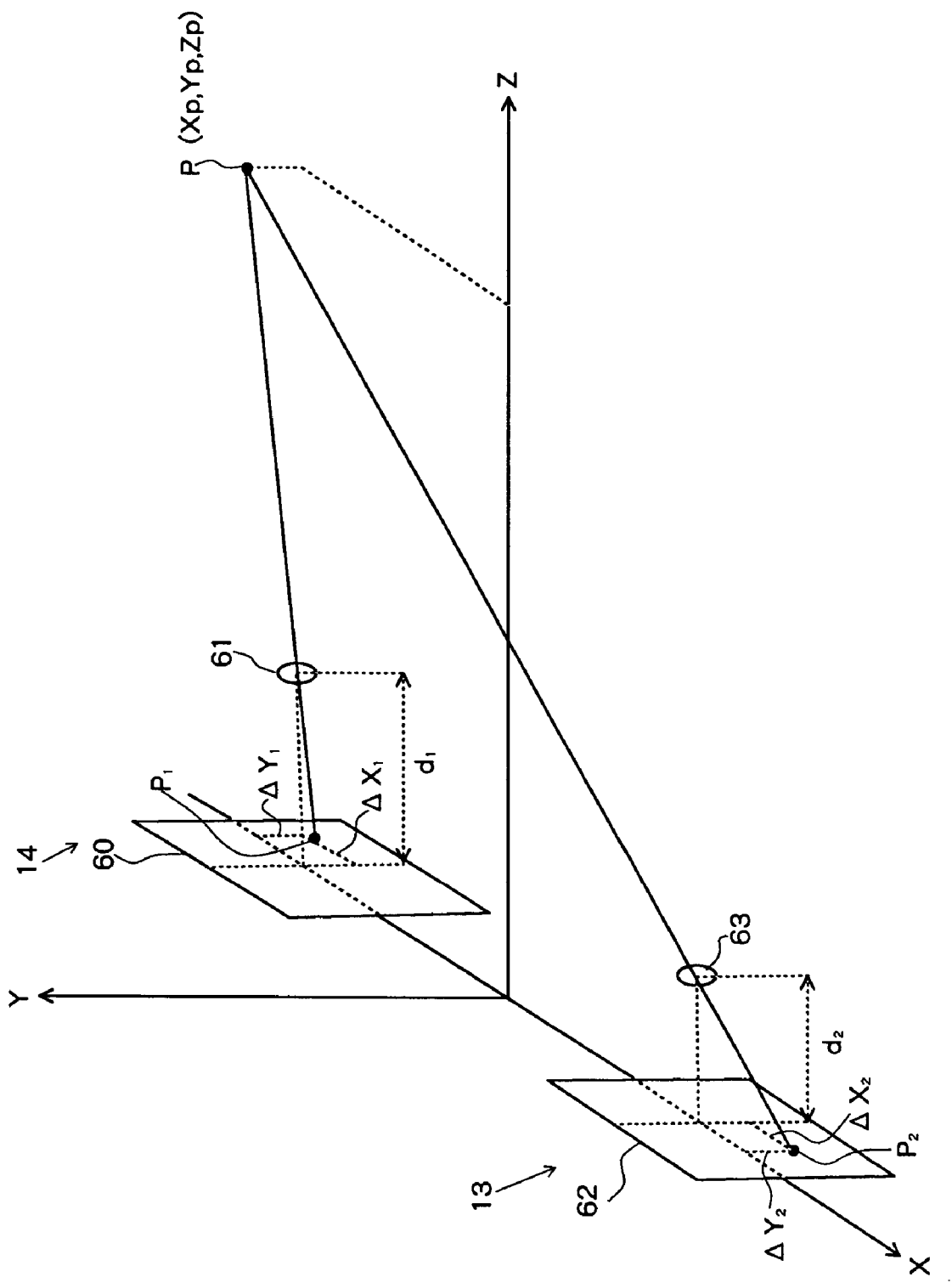
FIG. 9 is a diagram illustrative of the principles of the detection of a three-dimensional point.

The object point is positionally related to the imaged object points in the respective captured images of the two cameras as shown in FIG. 9. A process for determining the three-dimensional position of point P according to triangulation will be described below with reference to FIG. 9. When object point P is imaged by camera 14 through lens 61 thereof, the imaged object point has position $P_1$ on sensor element surface 60 of camera 14, and when object point P is imaged by camera 13 through lens 63 thereof, the imaged object point has position $P_2$ on sensor element surface 62 of camera 13. If distances $\Delta X_1$, $\Delta Y_1$, $\Delta X_2$, $\Delta Y_2$ with respect to the origins at the centers of the sensor element surfaces are known in FIG. 9, then the three-dimensional position ($X_p$, $Y_p$, $Z_p$) of object point P can be calculated according to triangulation from the distances $d_1$, $d_2$ between the sensor element surfaces and lenses 61, 63, the three-dimensional positions of cameras 13, 14, and the directions of cameras 13, 14.

After the three-dimensional position of the object point are detected, central distance detecting circuit 26 detects a central three-dimensional position, i.e., the three-dimensional position of pattern 56 projected onto the projection object, from the three-dimensional position detected by three-dimensional position detecting circuit 18 and the projection area detected by projection area calculating circuit 12, and determines a Z-axis component of the detected three-dimensional position as the central distance up to the projection object.

After the central distance is detected, since the relationship between the projection distance and the focus lens position is known, focus lens control circuit 27 determines a focus lens position corresponding to the central distance up to the projection object which is determined by central distance detecting circuit 26. Focus lens control circuit 27 instructs focus lens actuating circuit 7 to energize focus lens actuating motor 2 to focus the focus lens unit on the central distance. While focusing the focus lens unit on the central distance, focus lens actuating circuit 7 ignores focus lens actuating signal 10, but energizes only focus lens actuating motor 2 which is controlled by focus lens control circuit 27.

First, the focus lens unit is focused on a central area of the projected image. Then, after the position and surface shape of the projection object, and the outer frame of a screen if the screen is used as the projection object are detected, the focus lens unit is focused on the average distance up to the projection object. Accordingly, even if the projected image is out of focus, it can be brought into focus without the need for other focus adjusting means.

Figure 10:
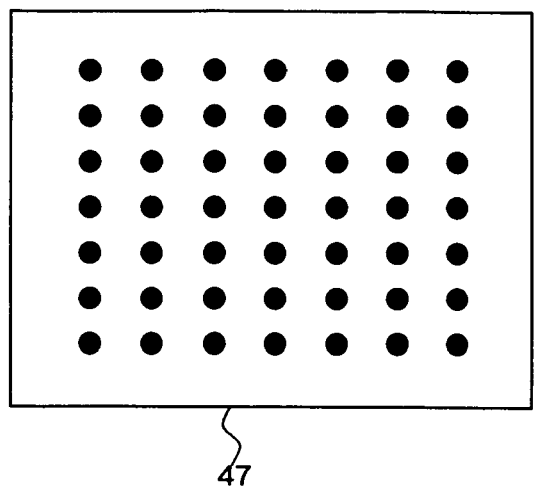
FIG. 10 is a diagram showing a projection surface detecting pattern by way of example.
Figure 11:
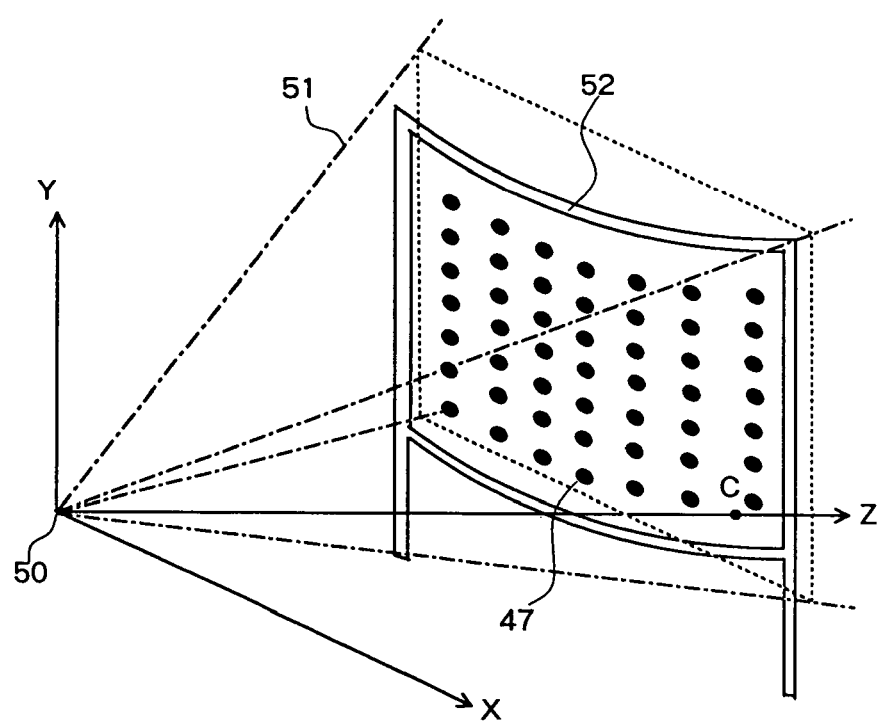
FIG. 11 is a diagram showing the projection surface detecting pattern as it is projected onto the curved screen shown in FIG. 4.

For correcting a distortion of an image projected onto the projection object, display pattern generating circuit 31 of test pattern generator 131 generates a pattern for detecting a projection surface, e.g., projection surface detecting pattern 47 shown in FIG. 10. Projection surface detecting pattern 47 is then projected through projection circuit 34 and projection lens 1 onto the projection object. When projection surface detecting pattern 47 is projected onto curved screen 52 shown in FIG. 4, projection surface detecting pattern 47 is displayed as shown in FIG. 11. The projection surface detecting pattern which can be used is not limited to projection surface detecting pattern 47 shown in FIG. 10, but may be another pattern such as, for example a cross-hatched (grid) pattern.

When projection surface detecting pattern 47 is projected as shown in FIG. 11, projection surface detecting pattern 47 projected onto the projection object is imaged by cameras 13, 14. Optical distortions caused in the respective images captured by cameras 13, 14 are corrected by optical distortion correcting circuit 15 and optical distortion correcting circuit 16. After the optical distortions caused by cameras 13, 14 are corrected, the two captured images are compared with each other by stereoscopic matching circuit 17 to detect identical object points in the captured images. From projection surface detecting pattern 47 in the two captured images, identical object points are detected by referring to a zoom ratio and projection area 51 which is an image projection range that depends on the distance from the projector. The zoom ratio is determined from the position of the zoom lens unit detected by zoom lens position detecting circuit 8 based on the known relationship between zoom ratios and zoom lens positions. Projection area 51 is calculated by projection area calculating circuit 12. Since projection surface detecting pattern 47 has known dimensions and positional relationship, and cameras 13, 14 also have known positions, directions, and imaging areas, the ranges of positions and the ranges of sizes of projection surface detecting patterns 47 in the two captured images can be determined by referring to projection area 51. Therefore, other points in the captured images and the projection surface detecting pattern are prevented from being detected erroneously as identical object points, and different projection surface detecting patterns are prevented from being detected erroneously as identical object points.

A projection surface detecting pattern, which is generated by display pattern generating circuit 31 and projected by projection circuit 34, the outer frame of a screen, if the screen is used as the projection object, or another background scene may be detected as an identical object point.

Figure 12:
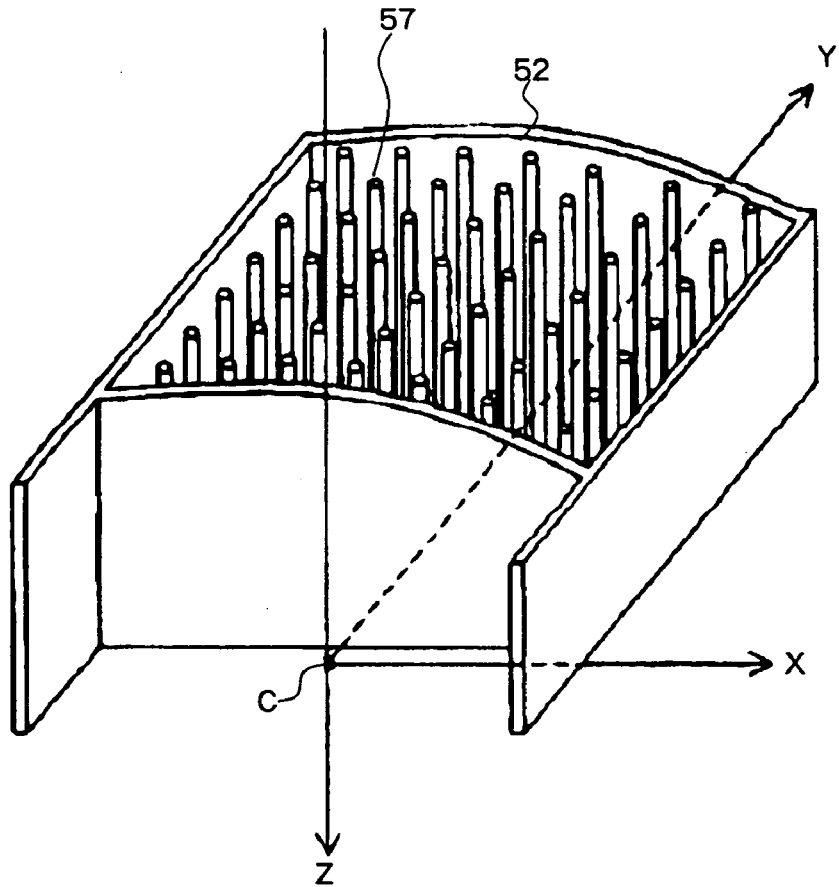
FIG. 12 is a diagram showing the three-dimensional relationship between an X-Y plane passing through a point C on the optical axis which extends as a Z-axis through the central projection point, the curved screen, and the projection surface detecting pattern.
Figure 13:
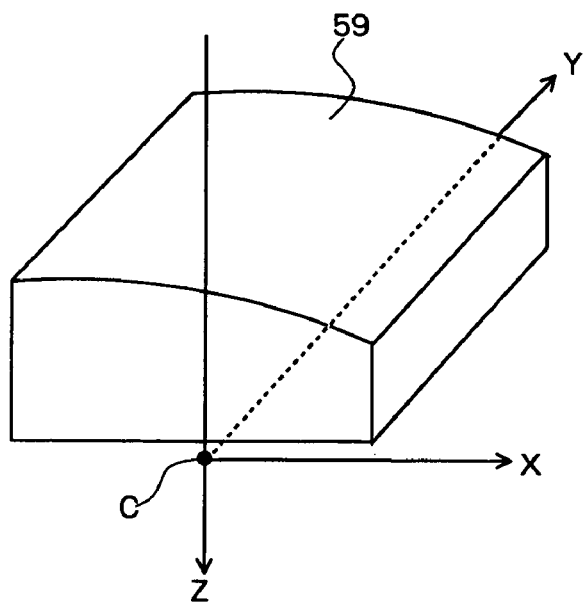
FIG. 13 is a diagram showing a curved surface that is generated by interpolating the three-dimensional position of the projection surface detecting pattern shown in FIG. 12.

Three-dimensional position detecting circuit 18 converts respective object points in the captured images into physical positions on the sensor element surfaces of the cameras, and detects the three-dimensional position of the object point according to triangulation from the distances between the sensor element surfaces and the lenses of the cameras, the three-dimensional positions of the two cameras, and the directions of the cameras. When projection surface detecting pattern 47 is displayed on curved screen 52 shown in FIG. 11, the three-dimensional position of the object point that is detected by three-dimensional position detecting circuit 18 is illustrated in FIG. 12 for better visual perception where an X-Y plane passes through a point C in FIG. 11 on a downwardly oriented Z-axis.

The three-dimensional position detected by three-dimensional position detecting circuit 18 is stored in three-dimensional position memory 19. Projection surface detecting circuit 20 detects the position and surface shape of the projection object from three-dimensional positions on projection surface detecting pattern 47 which is detected by three-dimensional position detecting circuit 18. If the projection object is a screen, then the outer frame of the screen is detected. The detected position and surface shape of the projection object, and also the detected outer profile are stored in detected projection surface register 21. At this time, the three-dimensional positions on projection surface detecting pattern 47 shown in FIG. 12 are interpolated to generate continuous curved surface 59 shown in FIG. 13 which corresponds to curved screen 52.

Distortion correction coefficient calculating circuit 22 calculates a coefficient required to correct an image distortion produced when an image is projected onto the projection object, from the relative positional relationship between the position and surface shape of the projection object, the output profile of a screen, if the screen is used as the projection object, which are stored in detected projection surface register 21, and the projection area from projection area calculating circuit 12.

Image distortion correcting circuit 24 of image controller 104 corrects a distortion of projected image input signal 23 based on the coefficient calculated by distortion correction coefficient calculating circuit 22 so that the projected image matches the surface shape of the projection object. If the projection object is a screen, then image distortion correcting circuit 24 of image controller 104 corrects a distortion of projected image input signal 23 in such a manner that it matches the shape of the screen. Projected image switching signal 33 is applied to control switching circuit 32 to select an output signal from image masking circuit 30. Now, an output signal from image distortion correcting circuit 24 is projected through image masking circuit 30, projection circuit 34, and projection lens 1. At this time, since no mask is set in image masking circuit 30, an image represented by projected image switching signal 33 that is corrected for image distortion is directly projected.

Figure 14A:
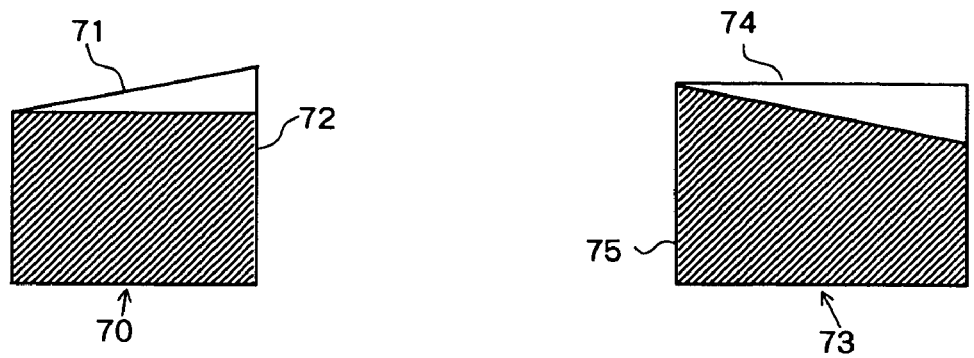
FIG. 14A is a diagram illustrative of an example of correcting an image distortion when an image is projected onto a flat projection object from the left.
Figure 14B:
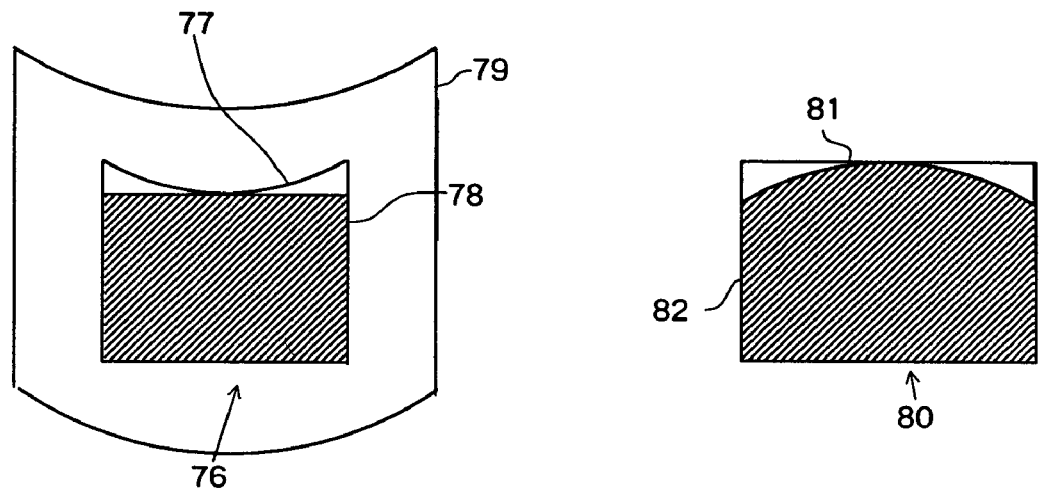
FIG. 14B is a diagram illustrative of an example of correcting an image distortion when an image is projected onto a cylindrical projection object from the front.
Figure 14C:
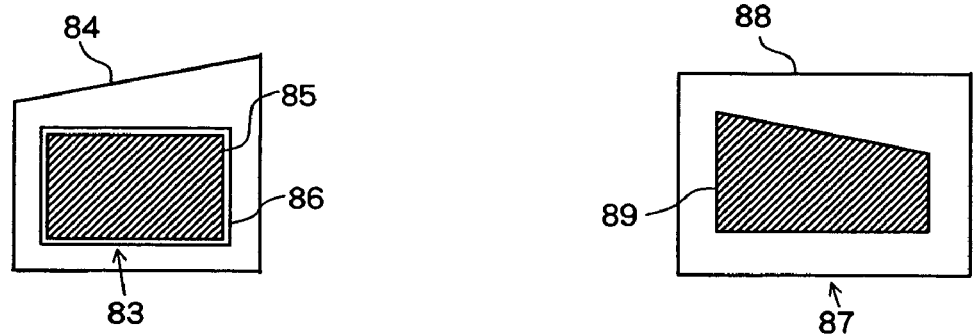
FIG. 14C is a diagram illustrative of an example of correcting an image distortion when an image is projected onto a screen from the left.

Examples of image distortion correction will be described below with reference to FIGS. 14A through 14C. FIG. 14A is illustrative of an example of correcting an image distortion when an image is projected onto a flat projection object from the left, FIG. 14B is illustrative of an example of correcting an image distortion when an image is projected onto a cylindrical projection object from the front, and FIG. 14C is illustrative of an example of correcting an image distortion when an image is projected onto a screen from the left.

When images 73, 80, 87 are projected as images 74, 81, 88 that are not corrected for a distortion, images 70, 76, 83 projected onto respective projection objects are displayed as respective images 71, 77, 84 that are not corrected for a distortion. According to the present invention, the position and surface shape of the projection object, and the outer profile of a screen, if the screen is used as the projection object, are detected, and image distortion correcting circuit 24 corrects images 73, 80, 87 into respective images 75, 82, 89 based on the detected data, and distortion-corrected images 75, 82, 89 are projected onto the respective projection objects. Images 70,76,83 that are projected onto the respective projection objects are now displayed as respective distortion-free images 72, 78, 85. If an image is projected onto screen 86 shown in FIG. 14C, then the image is corrected into image 85 which matches the outer profile of screen 86.

Average distance detecting circuit 25 of distance detector 122 detects the average distance of a portion of the projection object where the projected image distortion-corrected by image distortion correcting circuit 24 is displayed, from the position and surface shape of the projection object, and the outer profile of a screen, if the screen is used as the projection object, stored in detected projection surface register 21, and the projection area calculated by projection area calculating circuit 12.

After the average distance is detected, since the relationship between the projection distance and the focus lens position is known, focus lens control circuit 27 determines a focus lens position corresponding to the average distance up to the projection object which is determined by average distance detecting circuit 25. Focus lens control circuit 27 controls focus lens actuating circuit 7 to energize focus lens actuating motor 2 to focus the focus lens unit on the average distance, so that the focus lens position determined by focus lens position detecting circuit 6 is equal to the focus lens position corresponding to the average distance. While focusing the focus lens unit on the average distance, focus lens actuating circuit 7 ignores focus lens actuating signal 10, but energizes only focus lens actuating motor 2 which is controlled by focus lens control circuit 27.

Figure 15A:
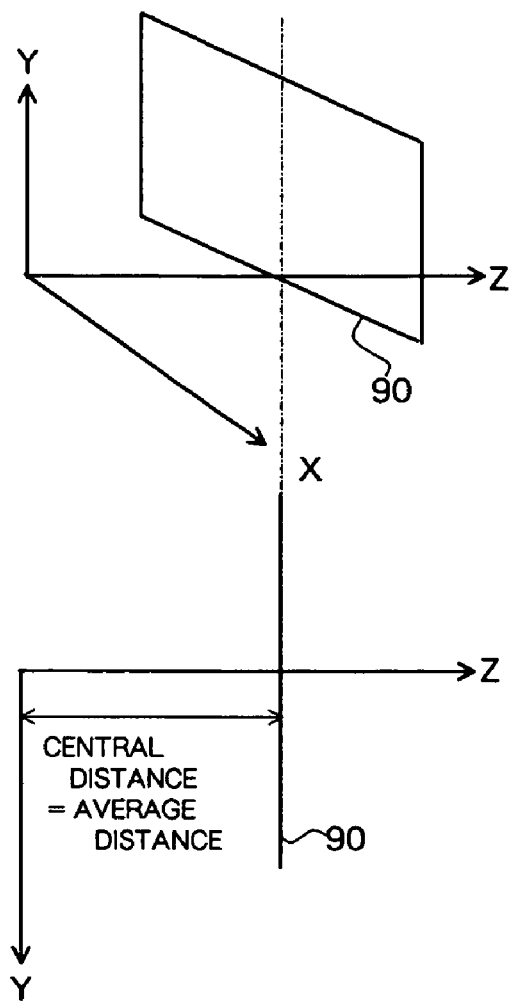
FIG. 15A is a set of diagrams showing the relationship between a central distance and an average distance up to a flat screen, the upper diagram showing the relationship in perspective and the lower diagram showing a projection onto a Z-plane.
Figure 15B:
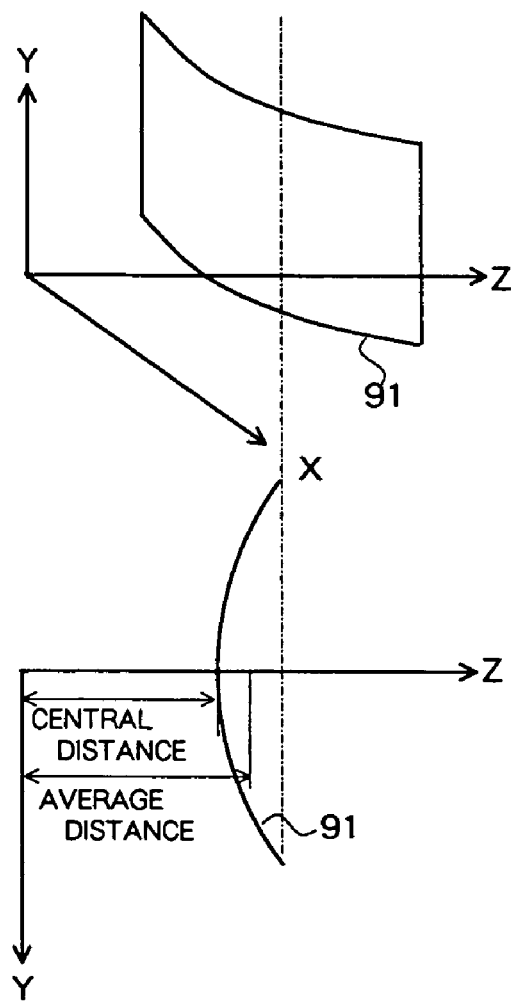
FIG. 15B is a set of diagrams showing the relationship between a central distance and an average distance up to a curved screen, the upper diagram showing the relationship in perspective and the lower diagram showing a projection onto a Z-plane.

The relationship between the central distance and the average distance depending on the screen shape will be described below with reference to FIGS. 15A and 15B. As shown in FIG. 15A, if the projection object is flat screen 90, then the central distance and the average distance thereof are in agreement with each other. As shown in FIG. 15B, if the projection object is not a flat surface, but curved screen 91, for example, then the central distance and the average distance thereof are not in agreement with each other. Focusing the focus lens unit on the average distance minimizes the amount that is defocused in an area of the projected image which is maximally out of focus, and brings the projected image into better focus.

The projection object may be a screen, a wall, or an object which is not flat. If the projection object is limited to a flat screen, then since only the outer profile of the screen can be imaged, it is not necessary to use projection surface detecting pattern 47 shown in FIG. 10. If the screen has a bright surrounding area and can be imaged itself by cameras, then projection surface detecting pattern 47 itself does not need to be projected. If the screen has a dark surrounding area and cannot be imaged itself by cameras, then an all-white pattern for illuminating the screen, rather than projection surface detecting pattern 47, may be projected. In this case, the distance from the three-dimensional position of the outer profile of the screen to the central projection point can be known. Since the central distance is equal to the average distance, it is not necessary to detect the central distance using focus adjustment pattern 46. Image distortion correction and focus adjustment can be performed by detecting the outer profile of the screen based on imaging the screen once and detecting the three-dimensional position.

Adjustments with respect to the installation of the projector are now finished, and subsequently a person detecting process and a pointing detecting process are carried out in a normal manner. The person detecting process and the pointing detecting process are carried out by repeatedly capturing images.

While the projector is in normal use to for projecting an image based on projected image input signal 23, the projected image is captured by cameras 13, 14, and optical distortions caused in the respective captured images by cameras 13, 14 are corrected by optical distortion correcting circuit 15 and optical distortion correcting circuit 16. After the optical distortions caused by cameras 13, 14 are corrected, the two captured images are compared with each other by stereoscopic matching circuit 17 to detect identical object points in the captured images.

Three-dimensional position detecting circuit 18 converts respective object points in the captured images into physical positions on the sensor element surfaces of the cameras, and detects the three-dimensional position of the object point according to triangulation from the distances between the sensor element surfaces and the lenses of the cameras, the three-dimensional positions of the two cameras, and the directions of the cameras.

Figure 16:
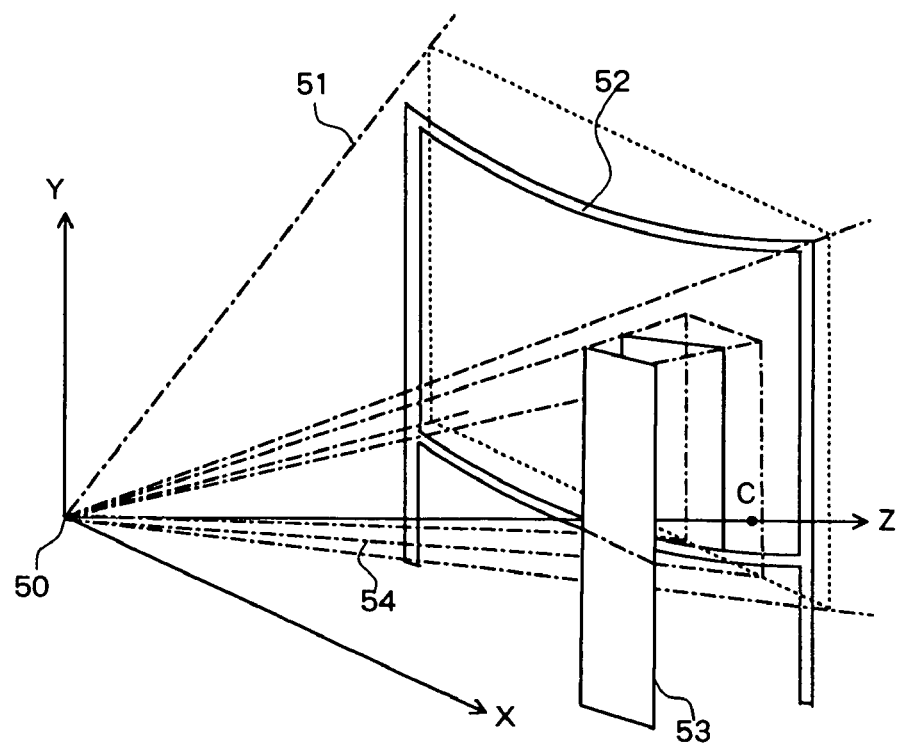
FIG. 16 is a diagram showing the curved screen shown in FIG. 4 with a person standing in front of the curved screen.
Figure 17:
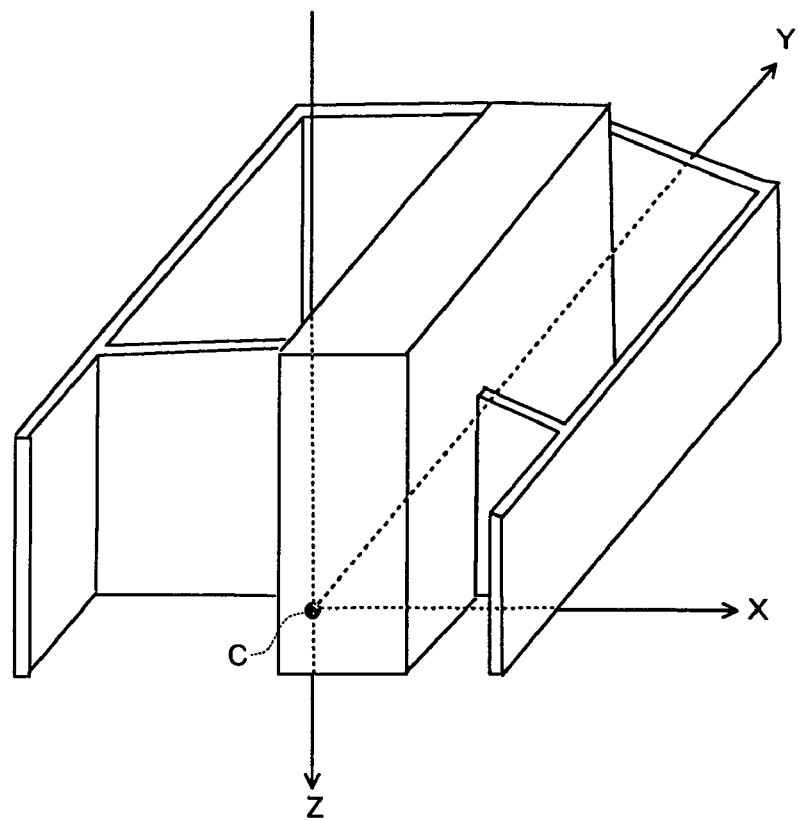
FIG. 17 is a diagram showing the three-dimensional relationship between an X-Y plane passing through a point C on the optical axis which extends as a Z-axis through the central projection point, the curved screen, and the person.

The person detecting process will be described below with reference to FIGS. 4, 16, and 17. When a person stands in front of curved screen 52 shown in FIG. 4, the person is regarded as a flat surface as illustrated in FIG. 16, and the three-dimensional position of the person is illustrated in FIG. 17 for better visual perception where an X-Y plane passes through point C in FIG. 16 on a downwardly oriented Z-axis.

Person detecting circuit 28 compares the detected three-dimensional position, the detected three-dimensional position stored in three-dimensional position memory 19 when the projection surface is detected, and the detected projection surface stored in detected projection surface register 21 with each other, and detects an obstacle located closer to the projector than the three-dimensional position stored in three-dimensional position memory 19 and the surface of the projection object, as a person.

When a person is detected, person masking position calculating circuit 29 calculates the position of the obstacle detected in the projected image from the projection area calculated by projection area calculating circuit 12. Then, image masking circuit 30 masks the region of the projected image which corresponds to the obstacle whose position has been calculated by person masking position calculating circuit 29, i.e., sets the portion of the projected image to a black level, for example. The region to be masked is represented by mask area 54 in FIG. 16, i.e., the region of the projected image where the person regarded as the flat surface is lighted, is masked.

Therefore, projected image input signal 23 is corrected by image distortion correcting circuit 24 for the distortion produced when it is projected, and masked for the region which corresponds to the obstacle in front of the projection object. An image based on corrected and masked projected image input signal 23 is now projected through projection circuit 34 and projection lens 1. As a result, essentially no light is applied from the projector to the person standing in front of the projection object, i.e., only light corresponding to the black level is applied to the person, who is prevented from being annoyed by the glare of light from the projector. Since the person detecting process is repeated each time a projected image is captured by the cameras, the masked position in the projected image changes as the person moves, so that essentially no light is applied from the projector to the person at all times.

Pointing detecting circuit 35 of pointed position detector 126 compares the detected three-dimensional position and the detected projection surface stored in detected projection surface register 21 with each other, and detects an object such as a finger or a pointing rod positioned on the surface of the projection object, and regards the coordinates of the object which are calculated from the relative relationship to the projection area calculated by projection area calculating circuit 12, as pointed coordinates. The pointed coordinates are then outputted as pointing coordinate output signal 36 to a presentation function (not shown) of projector 40 or personal computer 151 that is connected, for example to projector 40 through image information generator 105.

Using the coordinates, the presentation function can display data stored in a PC card or personal computer 151 can instruct image information generator 105 to project an icon or the like onto the projection object. When a displayed icon is pointed, the icon controls the operation of the projector 40, e.g., changes presentation pages, enlarges presentation pages, or scrolls presentation pages. Incidentally, a drawing can be performed by drawing a line along a painted coordinate on a projection image.

A projector having a plurality of cameras according to a second embodiment of the present invention will be described below with reference to FIGS. 18 and 19.

In the first embodiment, imager 111 has two sets of cameras 13, 14 and distortion correcting circuits 15,16. According to the second embodiment, the imager has three sets of cameras and distortion correcting circuits. Other details of the projector according to the second embodiment are identical to those of the projector according to the first embodiment. Those parts of the projector shown in FIG. 18 which are identical to those shown in FIG. 2 are denoted by identical reference characters, and will not be described in detail below.

Figure 2:
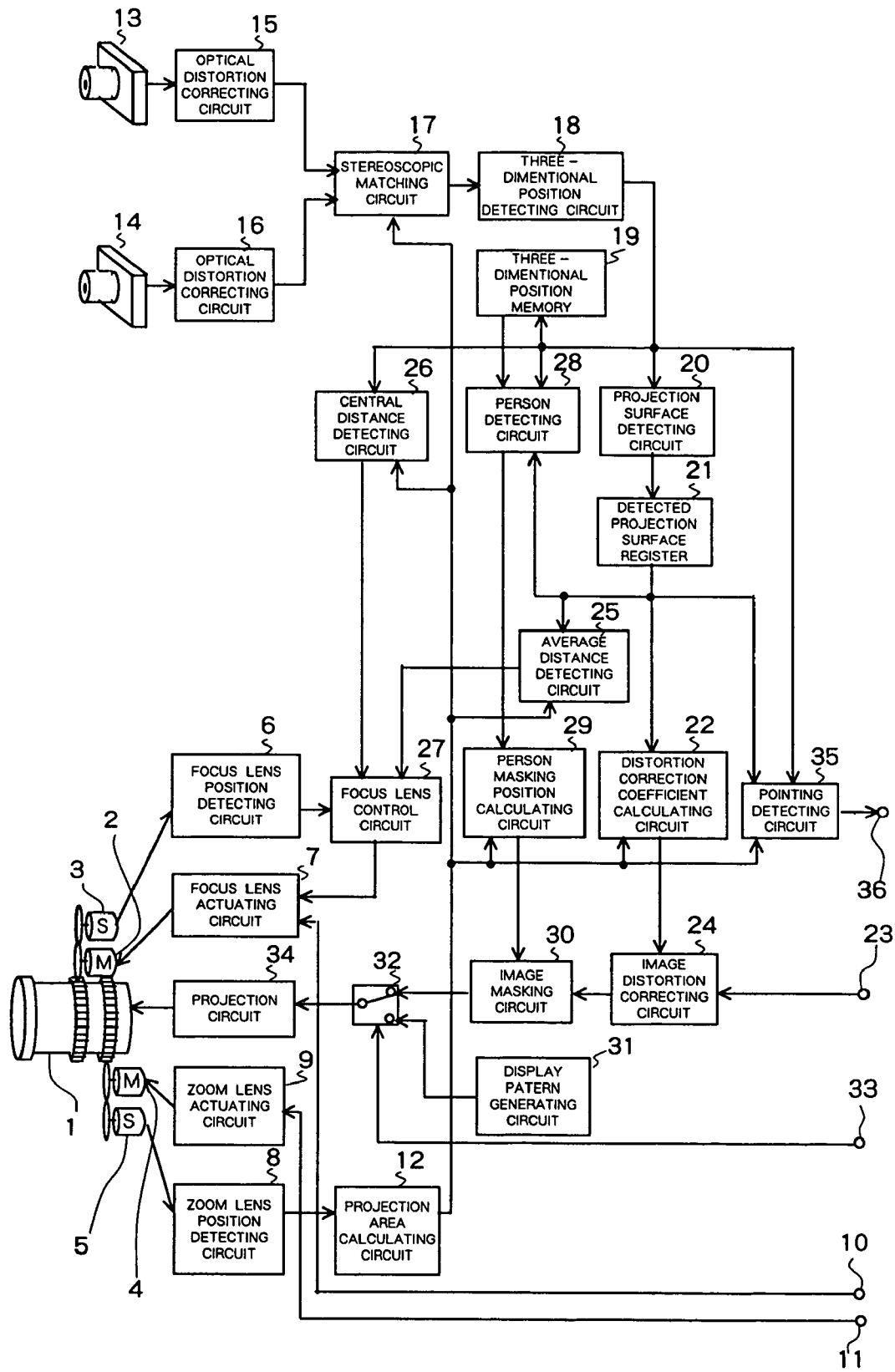
FIG. 2 is a block diagram of a detailed circuit of the projector according to a first embodiment of the present invention.
Figure 18:
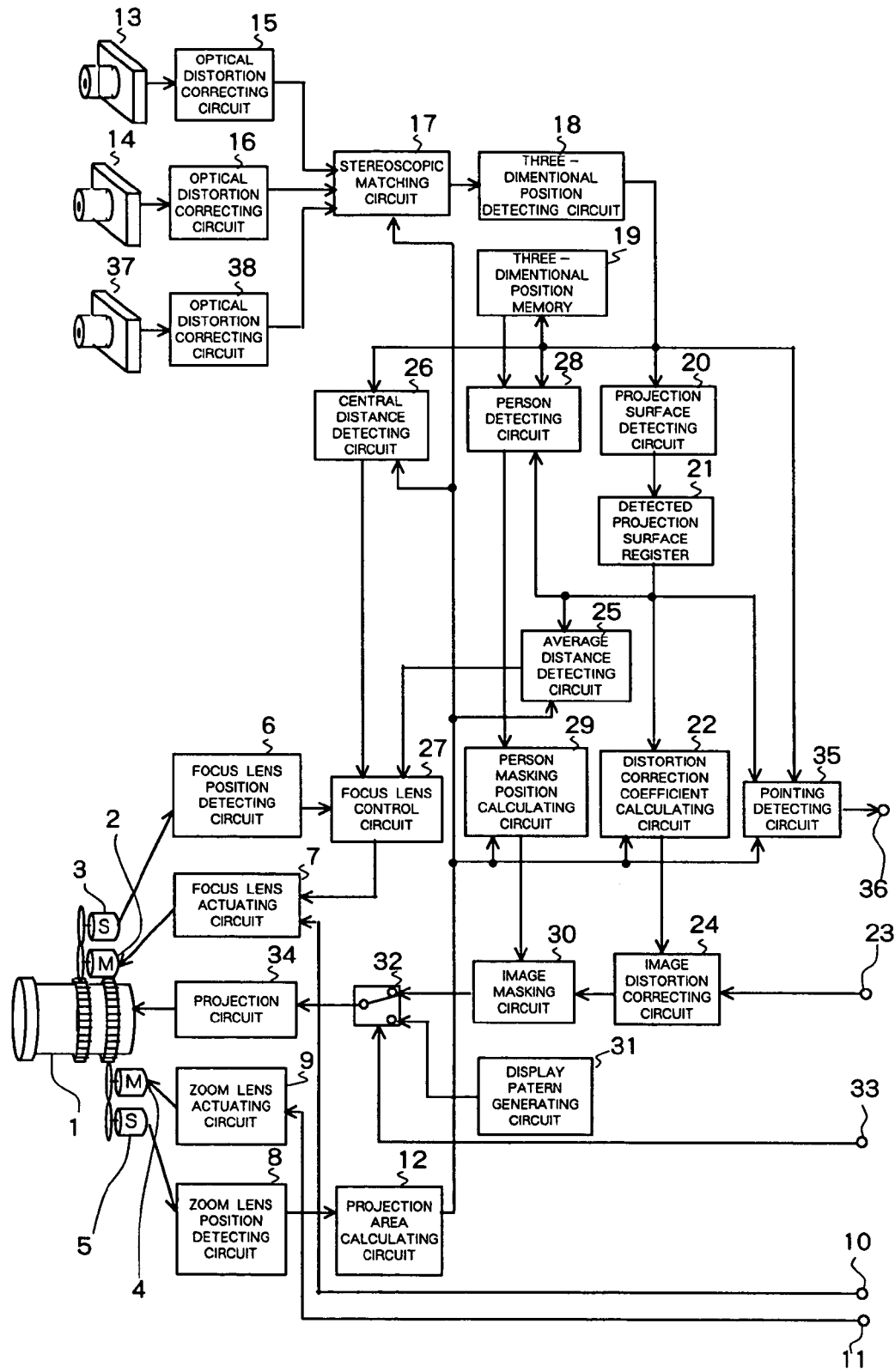
FIG. 18 is a block diagram of a detailed circuit of a projector according to a second embodiment of the present invention.
Figure 19:
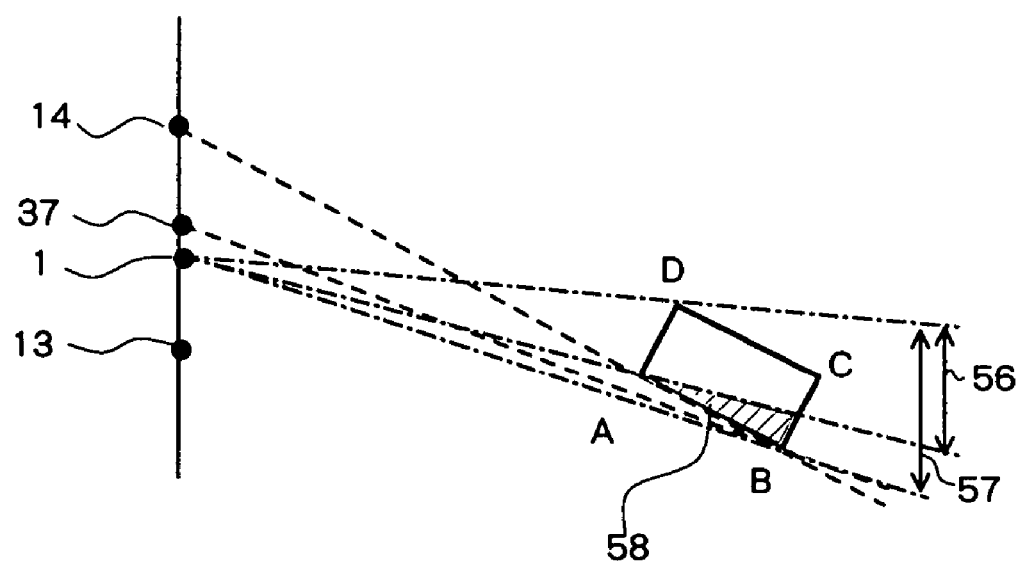
FIG. 19 is a diagram showing a masked state as viewed from above when a person is present in front of a projection object.

In FIG. 18, camera 37 and distortion correcting circuit 38 are added to cameras 13, 14 and distortion correcting circuits 15, 16 shown in FIG. 2, so that a total of three cameras are employed. The increased number of cameras reduces a dead area, allowing three-dimensional positions to be measured more accurately. As shown in FIG. 19, if two cameras 13, 14 are used to measure three-dimensional positions, then point A can be detected, but point B cannot be detected as it is placed in the dead area of camera 14. As a result, when a person is to be detected and the projected image is to be masked based on the detected person, points A, D are detected by two cameras 13, 14, and region 56 is masked, leaving region 58 unmasked.

According to the second embodiment, third camera 37 is used in addition to two cameras 13, 14 to mask region 57. Since unmasked region 58 is not generated, the person is masked accurately.

While preferred embodiments of the present invention have been described using specific terms, such description is for illustrative purposes only, and it is to be understood that changes and variations may be made without departing from the spirit or scope of the following claims.

What is claimed is:

1. A projector comprising:
    a projection device having a projection lens;
    a focus adjuster for adjusting the focus of said projection lens;
    a zoom adjuster for adjusting the zooming of said projection lens;
    an imager having a plurality of cameras for capturing respective images of a projection object;
    a projection area calculator for calculating a projection area of an image depending on a distance from the projection lens based on a zoomed position from said zoom adjuster;
    a three-dimensional position detector for detecting a three-dimensional position of a predetermined object point corresponding to identical object points in the respective images captured by said cameras from the images captured by said cameras and the projection area of the image calculated by said projection area calculator;
    a distance detector for detecting the distance up to the object point from the three-dimensional position of said predetermined object point;
    an image controller for controlling a projected image;
    an image information generator generating image information;
    a projection surface detector for detecting distances up to said object points from the three-dimensional positions of a plurality of said predetermined object points which are detected by said three-dimensional position detector and arranging the detected distances two-dimensionally; and
    a pointed position detector for detecting an obstacle having a predetermined shape which is interposed between a predetermined area of the projected image which is projected onto said projection object as a pointing command;
    wherein said object points are indicated two-dimensionally on the projected image which is projected onto said projection object;
    said pointed position detector compares distances up to said object points with said projection surface detector, extracts a group of a plurality of said object points which are disposed on a surface of the projection, object and disposed in a predetermined shape at shorter distances, defines the extracted group as the pointing command, acquires two-dimensional positions of said group, and outputs the acquired two-dimensional positions of said group to said image information generator; and
    said image information generator reads contents of the pointing command from the two-dimensional positions of said group input thereto, performs a process corresponding to the pointing command, adds corresponding information to said image information, and outputs the image information with the added information to said image controller.

2. A projector according to claim 1, wherein said object point comprises a predetermined pattern projected from said projection device onto said projection object near a central area thereof, and the focus of said projection lens is adjusted by said focus adjuster based on the distance up to the object point which is detected by said distance detector.

3. A projector according to claim 1,
    wherein said object points comprise a plurality of patterns projected in a plane onto said projection object by said projection device;
    said distance detector calculates an average distance based on the distances up to said object points which are detected by said projection surface detector; and
    said focus adjuster adjusts the focus of said projection lens based on the calculated average distance.

4. A projector according to claim 1, further comprising:
a distortion correction calculator for calculating a corrective value for correcting a projected image that is distorted,
wherein said projection object comprises a screen, said object points comprise a boundary line between said screen and a background scene and an outer profile of said projected image which is projected onto said screen by said projection device;
said distortion correction calculator calculates a distortion correction coefficient for said projected image inputted to said projection device so that the outer profile of said projected image is aligned with the boundary line between said screen and the background scene, based on the projection surface detected by said projection surface detector; and
said image controller corrects said projected image based on said distortion correction coefficient.

5. A projector according to claim 1, further comprising:
a person detector/mask position calculator for detecting an obstacle including a person interposed between the projected image which is projected onto said projection object and said projection device and generating information to mask a projected image which is projected onto the obstacle;
wherein said object points are indicated two-dimensionally on the projected image which is projected onto said projection object;
said person detector/mask position calculator compares distances up to said object points with said projection surface detector, extracts a group of a plurality of said object points which are disposed at shorter distances and arranged two-dimensionally, defines the extracted group as the obstacle including a person, and acquires two-dimensional positions of said group; and
said image controller converts an image of a portion of said projected image which corresponds to the two-dimensional positions of said group into a predetermined color, and projects the image in the predetermined color from said projection device.

6. A projector according to claim 1, wherein said three-dimensional position detector detects the three-dimensional position of the predetermined object point, according to triangulation from the relationship between the positions on element surfaces of said cameras, of the identical object points in the respective images captured by said cameras and the positions of lenses of said cameras.

7. A projector according to claim 1, wherein said imager has at least two cameras.

8. A projector comprising:
a projection device having a projection lens;
a focus adjuster for adjusting the focus of said projection lens;
a zoom adjuster for adjusting the zooming of said projection lens;
an imager having a plurality of cameras for capturing respective images of a projection object;
a projection area calculator for calculating a projection area of an image depending on a distance from the projection lens based on a zoomed position from said zoom adjuster;
a three-dimensional position detector for detecting a three-dimensional position of a predetermined object point corresponding to identical object points in the respective images captured by said cameras from the images captured by said cameras and the projection area of the image calculated by said projection area calculator;
a distance detector for detecting the distance up to the object point from the three-dimensional position of said predetermined object point;
a projection surface detector for detecting distances up to said object points from the three-dimensional positions of a plurality of said predetermined object points which are detected by said three-dimensional position detector and arranging the detected distances two-dimensionally;
wherein said object points comprise a plurality of patterns projected in a plane onto said projection object by said projection device;
said distance detector calculates an average distance based on the distances up to said object points which are detected by said projection surface detector; and
said focus adjuster adjusts the focus of said projection lens based on the calculated average distance;
said projector further comprising:
an image controller for controlling a projected image; and
a distortion correction calculator for calculating a corrective value for correcting a projected image that is distorted;
wherein said distortion correction calculator calculates a distortion correction coefficient for correcting a distortion of said projected image based on the difference between the distances that are based on the distances up to said object points which are detected by said projection surface detector; and
said image controller corrects the projected image inputted to said projection device based on said distortion correction coefficient.

* * * * *